United States Patent
Ball (10) Patent No.: US 7,272,823 B2
(45) Date of Patent: Sep. 18, 2007

(54) METHOD AND APPARATUS FOR SOFTWARE METRICS IMMEDIATE FEEDBACK MECHANISM

(75) Inventor: Thomas A. Ball, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 519 days.

(21) Appl. No.: 10/225,732

(22) Filed: Aug. 22, 2002

(65) Prior Publication Data

US 2004/0040014 A1    Feb. 26, 2004

(51) Int. Cl.
G06F 9/44 (2006.01)

(52) U.S. Cl. .................. 717/125; 717/100

(58) Field of Classification Search ........... 717/100, 717/124, 125, 127, 126, 105; 716/5
See application file for complete search history.

(56) References Cited

U.S. PATENT DOCUMENTS

| | | | |
|---|---|---|---|
| 6,493,868 B1 * | 12/2002 | DaSilva et al. | 717/105 |
| 6,571,375 B1 * | 5/2003 | Narain et al. | 716/5 |
| 6,895,577 B1 * | 5/2005 | Noble et al. | 717/126 |
| 6,901,582 B1 * | 5/2005 | Harrison | 717/127 |

OTHER PUBLICATIONS

"PERFIDE: an environment for eveluation and monitoring of software reliability metrics during the test phase", Mainini et al., 1990 (6 pages). Online retrieved at <http://ieeexplore.ieee.org/iel1/2225/1643/00042971.pdf?tp=&arnumber=42971&isnumber=1643>.*

"A language support environment for complex distributed real-time applications", Stoyen et al., 1997 (10 pages). Online retrieved at <http://ieeexplore.ieee.org/iel3/4906/13521/00622313.pdf?tp=&arnumber=622313&isnumber=13521>.*

"Using the Metrics Module", NetBeans, Development Version (Build Apr. 17, 2002), 4 pages. [Online] [Retrieved at] <metrics.netbeans.org/user.html>.*

"NetBeans Icon Badging Proposal", NetBeans, Oct. 2000, 4 pages. [Online] [Retrieved at] <ui.netbeans.org/docs/badging/badging.html>.*

Jan Rojcek, "NetBeans: Object Browser", May 15, 2001, <http://ui.netbeans.org/docs/ui/objectBrowser/ObjectBrowserUV.html>, 4 pages.*

* cited by examiner

Primary Examiner—Tuan Dam
Assistant Examiner—Thuy Dao
(74) Attorney, Agent, or Firm—Osha Liang LLP (57) ABSTRACT

A method of providing software metrics attribute feedback involves setting a metrics attribute threshold value for a software component, generating a plurality of undesirable metrics attribute values using the metrics attribute threshold value, compiling the software component using a development tool, measuring a metrics attribute value of the software component, and displaying a metrics feedback icon if the metrics attribute value equals at least one of the plurality of undesirable metrics attribute values.

15 Claims, 7 Drawing Sheets

METHOD AND APPARATUS FOR SOFTWARE METRICS IMMEDIATE FEEDBACK MECHANISM

BACKGROUND OF INVENTION

Software testing is essential to developing quality software products. Software testing involves operating a software application or a software system under a set of controlled conditions and evaluating the results. There are a variety of software tests which software applications may be subjected to, e.g., black box testing, white box testing, integration testing, regression testing, stress and load testing, usability testing, etc. Each software test allows a measurement of the actual performance of the software application versus desired performance of the software application.

Testing tools are another aspect of software testing. A variety of automated tools exist for testing software applications, e.g., code analyzers, coverage analyzers, memory analyzers, load and performance tools, web test tools, test case management tools, bug reporting, etc. Many of the tools mentioned above use static analysis, which involves inspection of source code of software when the software is not being executed.

Testing, and in particular, software testing in conjunction with testing tools and metrics, is often introduced in the latter stages of a software development process. There are often separate groups or teams involved in the software development process, e.g., a development team, a management team, and a testing team. The development team includes software engineers, programmers, etc. The management team may include software architects, team leaders, project managers, etc. The testing team includes test engineers, software testers, code developers, etc.

Figure 1:
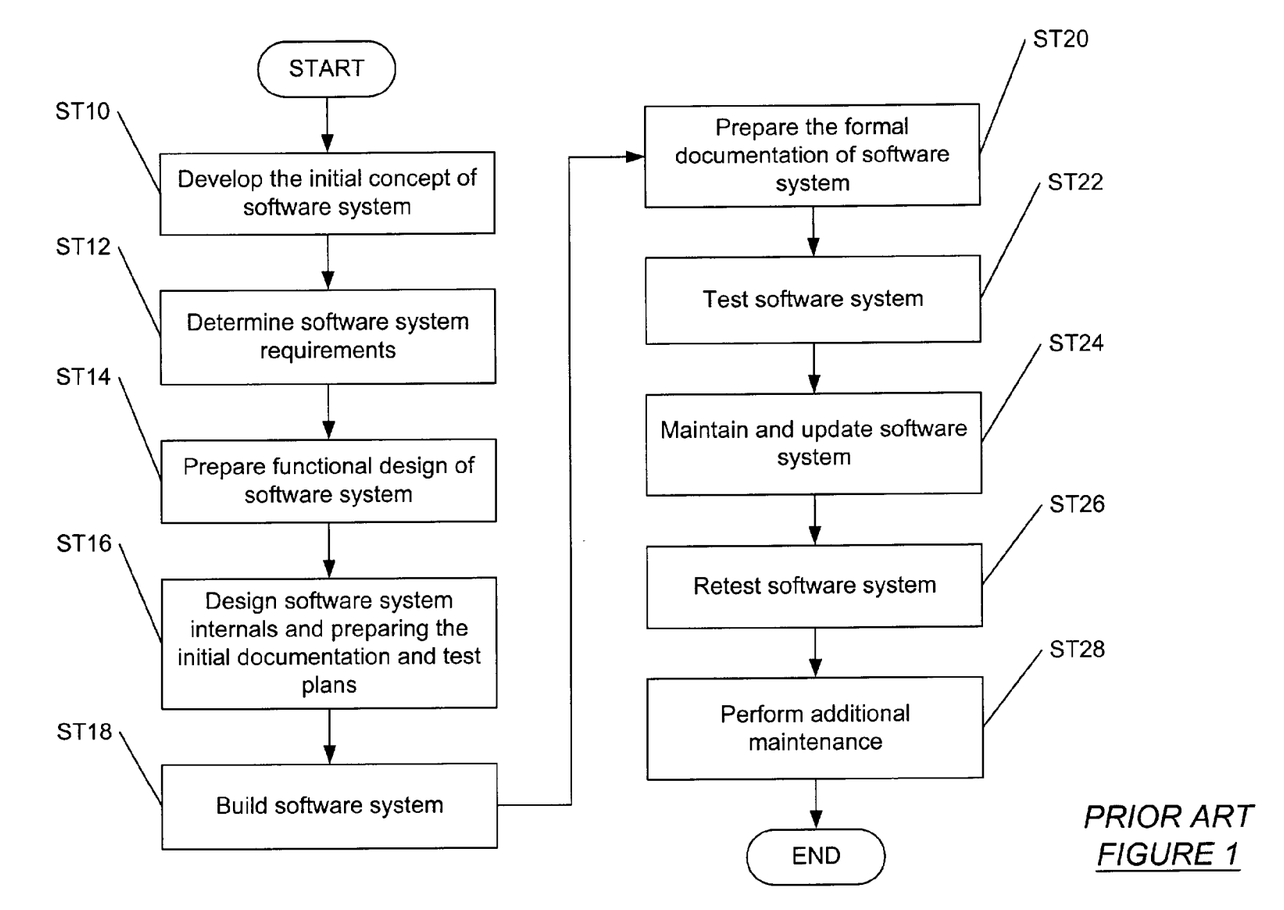
FIG. 1 shows a flow chart of a typical software development process.

FIG. 1 shows a flow chart of a typical software development process. The process begins with the initial concept of a software system (Step 10). The necessary requirements of the software system are determined (Step 12), and functional design of the software system is prepared (Step 14). Additional designs are generated for internal functions, and plans for the documentation and tests are prepared (Step 16). The management team is typically involved in generating designs and documentation plans.

The software system is coded (Step 18). Typically, a development tool, such as an Integrated Development Environment (IDE) is used by members of the development team, especially code developers. The IDE is a programming environment that has been packaged as a software application, and often normally includes a code editor, a compiler, a debugger, and often a Graphical User Interface (GUI) builder. IDE's vary in complexity, from a simple editor with a compiler and possibly debugger extensions, to a complex development application which includes facilities to support teamwork, such as access to a shared code depository.

Next, documentation supporting the system is prepared (Step 20), and then the software testing begins (Step 22). The testing team or a group aside from the development team usually performs testing, but in some instances the development team may perform testing. Any maintenance or updates are implemented as a result of the testing (Step 24), i.e., identified bugs are addressed.

The software system may be re-tested (Step 26) and additional maintenance is implemented, if necessary (Step 28). The software development process described above is commonly known as a Systems Development Life Cycle model (SDLC model) and occasionally referred to as a "waterfall model." The SDLC model is an iterative process and usually proceeds in strict order.

Often, use of an SDLC model for software development results in a flow of information such that the development team and the testing team communicate with each other. For example, the management team relays requirements and designs to the development team. Similarly, the management team relays testing requirements and test plans to the testing team. The test requirements and test plans include criteria by which the software application is to be evaluated. Once software testing begins, issues regarding performance found by the testing team are discussed with the management team and relayed back to the development team, as needed.

Testing tools are often used to determine values of metrics. Metrics are often used to provide objective criteria for evaluation of software applications. Metrics focus on issues of complexity, extensibility, modularity, readability, etc. Particular aspects of software applications may be quantified using metrics attributes. Metrics attributes are measurements used in software tests to locate potential problem areas within the software application. Different than a "bug," metrics attributes are desired standards in the design and operation of the software application, rather than mistakes or errors in the functionality of the software application. Testing "good code" is not purely a consideration of error free code, instead "good code" is considered for complexity, extensibility, modularity, readability, etc. Testing tools are often used to determine values of metrics attributes. Formulas may be used to calculate numeric values for particular metrics attributes.

Metrics may be oriented towards a particular design or programming paradigm. For example, object-oriented metrics attributes are metrics designed specifically to evaluate the performance of object-oriented code. Examples of objected-oriented metrics attributes include Depth of Inheritance Tree (DIT), Number of Children (NOC), Coupling Between Objects (CBO), Weighted Methods per Class (WMC), Response for Class (RFC), Message Passing Coupling (MPC), etc. Each of the object-oriented metrics attribute provides different information as to quality of the object-oriented code. The information may relate to functions, classes, or an entire software system. For example, MPC is a measure of message passing among classes, indicating a measure of coupling between a class and an entire software system. Determining a value of MPC provides an indication of software application complexity. Although a measured value of a metrics attribute may be out-of-bounds (either high or low), the software application may not necessarily be flawed. Metrics attributes give guidance as to desired standards, but are not necessarily mandates.

Many techniques may be used to determine values of metrics attributes. One such technique is static analysis. Static analysis is typically used to locate problem areas in the source code or compiled code, e.g., potential bugs, unnecessary complexity, or high maintenance areas. Several mechanisms (similar to compilers) are used to perform static analysis, e.g., lexical or binary scanning, parsing, semantic analysis, data flow analysis, etc.

For example, after testing an object-oriented software application, the value of the MPC metrics attribute between Class X and Class Y may be found to be high, indicating Class X and Class Y are strongly coupled. Strongly coupled classes are closely tied together, so that modifications attempted to one class are more likely to affect the other class, should modification be required. In a typical scenario, the MPC metrics attribute, along with other metrics attributes, are compiled into performance reports and discussed with the management team. The management team suggests improvements to problem areas in the source code, e.g., to improve the message coupling between Class X and Class Y. The improvements are communicated to the development team for resolution.

Metrics reports are often used in software development to improve software quality. The metrics reports may be generated at certain points during the development in cycle (e.g., approximately halfway between start of development and the expected release date of the software). Such metrics reports may be presented as feedback to the management team. There is a definite cost associated with time, money, resources (tools and people), and space expended to develop a software system using the aforementioned process.

SUMMARY OF INVENTION

In general, in one aspect, the invention relates to a method of providing software metrics attribute feedback. The method comprises setting a metrics attribute threshold value for a software component, generating a plurality of undesirable metrics attribute values using the metrics attribute threshold value, compiling the software component using a development tool, measuring a metrics attribute value of the software component, and displaying a metrics feedback icon if the metrics attribute value equals at least one of the plurality of undesirable metrics attribute values.

In general, in one aspect, the invention relates to a software metrics feedback mechanism. The software metrics feedback mechanism comprises a software component compiled via a development tool, a data store comprising a metrics attribute threshold value and a plurality of undesirable metrics attribute values of the software component, and a metrics feedback icon displayed if a metrics attribute value of the software component equals at least one of the plurality of undesirable metrics attribute values.

In general, in one aspect, the invention relates to a computer system for providing software metrics attribute feedback. The computer system comprises a processor, a memory, a storage device, a computer display, and software instructions stored in the memory for enabling the computer system under control of the processor, to perform setting a metrics attribute threshold value for a software component, generating a plurality of undesirable metrics attribute values using the metrics attribute threshold value, compiling the software component using a development tool, measuring a metrics attribute value of the software component, and displaying on the computer display a metrics feedback icon if the metrics attribute value equals at least one of the plurality of undesirable metrics attribute values.

In general, in one aspect, the invention relates to an apparatus for providing software metrics attribute feedback. The apparatus comprises means for setting a metrics attribute threshold value for a software component, means for generating a plurality of undesirable metrics attribute values using the metrics attribute threshold value, means for compiling the software component using a development tool, means for measuring a metrics attribute value for the software component, and means for displaying a metrics feedback icon if the metrics attribute value equals at least one of the plurality of undesirable metrics attribute values.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 2:
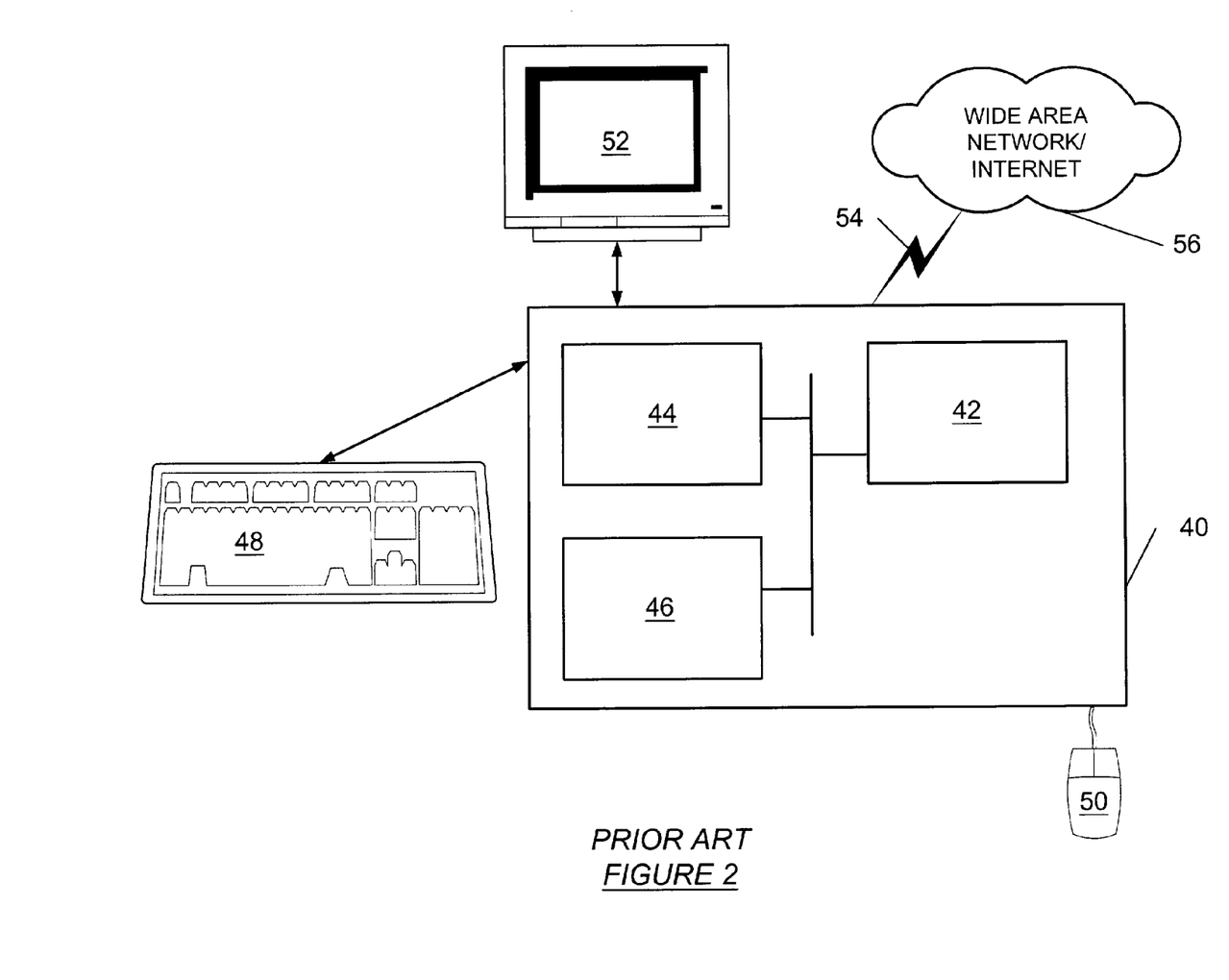
FIG. 2 shows a typical networked computer system.

The invention may be implemented on virtually any type computer regardless of the platform being used. For example, as shown in FIG. 2, a typical computer (40) includes a processor (42), associated memory (44), a storage device (46), and numerous other elements and functionalities typical of today's computers (not shown). The computer (40) may also include input means, such as a keyboard (48) and a mouse (50), and an output device, such as a monitor (52). Those skilled in the art will appreciate that these input and output means may take other forms in an accessible environment. The computer (40) may be connected via a network connection (54) to a Wide Area Network (WAN) (56), such as the Internet.

Figure 3:
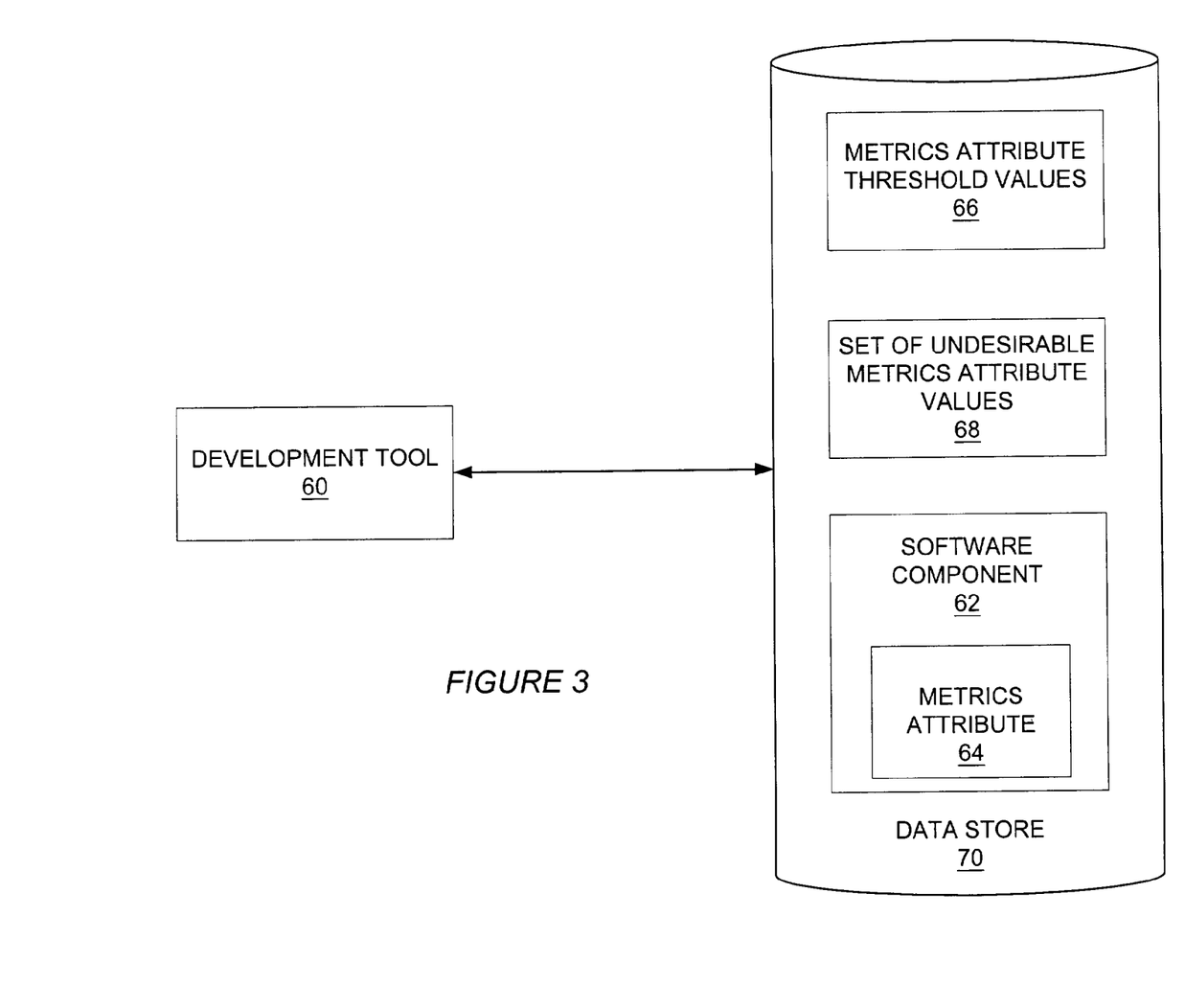
FIG. 3 shows entities used with a mechanism for communicating feedback concerning software metrics information to a user of a development tool in accordance with one or more embodiments of the invention.

In accordance with one or more embodiments of the invention, entities used with a mechanism for communicating feedback concerning software metrics information to a user of a development tool are shown in FIG. 3. The development tool (60), e.g., an IDE, is connected to a software component (62).

In accordance with one or more embodiments of the invention, the development tool (60) is connected to the software component (62) via an operating system. The software component (62) includes a metrics attribute (64). The software component (62), in one or more embodiments of the invention, may be a construct of an object-oriented application, such as a class or a method. Alternatively, the software component (62) may represent the entire object-oriented application, or some portion thereof, such as a block of source code. The metrics attribute (64) represents software metrics information regarding the software component (62). For example, if the software component (62) is a class, the metrics attribute (64) may represent an NOC (Number of Children that are direct descendants) of the software component (62). The software component (62) may represent one or more software components (e.g., one or more classes, methods, etc.), and the metrics attribute (64) may represent multiple software metrics (e.g., NOC, NT, WMC, etc). For example, the software component (62) may represent an object-oriented software application that includes multiple classes and multiple methods.

The development tool (60) is connected to a set of metrics attribute threshold values (66) and a set of undesirable metrics attribute values (68). In accordance with one or more embodiments of the invention, the development tool (60) is connected to the set of metrics attribute threshold values (66) and the set of undesirable metrics attribute values (68) via an operating system. The set of metrics attribute threshold values (66) includes values of metrics attributes (e.g., NOC, NT, WMC, etc). For example, the set of metrics attribute threshold values (66) may include a value of 10 for the NOC metrics attribute.

In one or more embodiments of the invention, metrics attribute threshold values of the set of metrics attribute threshold values (66) are used to define the set of undesirable metrics attribute values (68). For example, the threshold value of 10 for the NOC metrics attribute, as included in the set of metrics attribute threshold values (66), defines a range of undesirable values for the NOC metrics attribute. Therefore, in accordance with one or more embodiments of the invention, for the NOC metrics attribute, a range of undesirable values from 10 to positive infinity exists in the set of undesirable metrics attribute values (68).

Those skilled in the art will realize that, although metrics attribute threshold values are typically considered from a "greater than" perspective, particular metrics attribute threshold values included in the set of metrics attribute threshold values (66) may apply to both "greater than" and "less than" considerations. Thus, a range of values from a particular threshold value to negative infinity may exist in the set of undesirable metrics attribute values (68) for a particular software metrics attribute. Furthermore, ranges included in the set of undesirable metrics attribute values (68) for a particular software metrics attribute may be non-contiguous, and may be defined by multiple metrics attribute threshold values.

Referring to FIG. 3, the software component (62), the metrics attribute (64), the set of metrics attribute threshold values (66), and the set of undesirable metrics attribute values (68) may be included as part of a data store (70). The data store (70) may exist on secondary storage (e.g., a hard drive, a tape drive, etc.) as part of one or more computer systems as one or more discrete units, or may exist in volatile memory (e.g., Random Access Memory (RAM), etc.) on one or more computer systems. Those skilled in the art will appreciate that entities shown in FIG. 3 may differ in arrangement, in accordance with one or more embodiment of the present invention.

Figure 4:
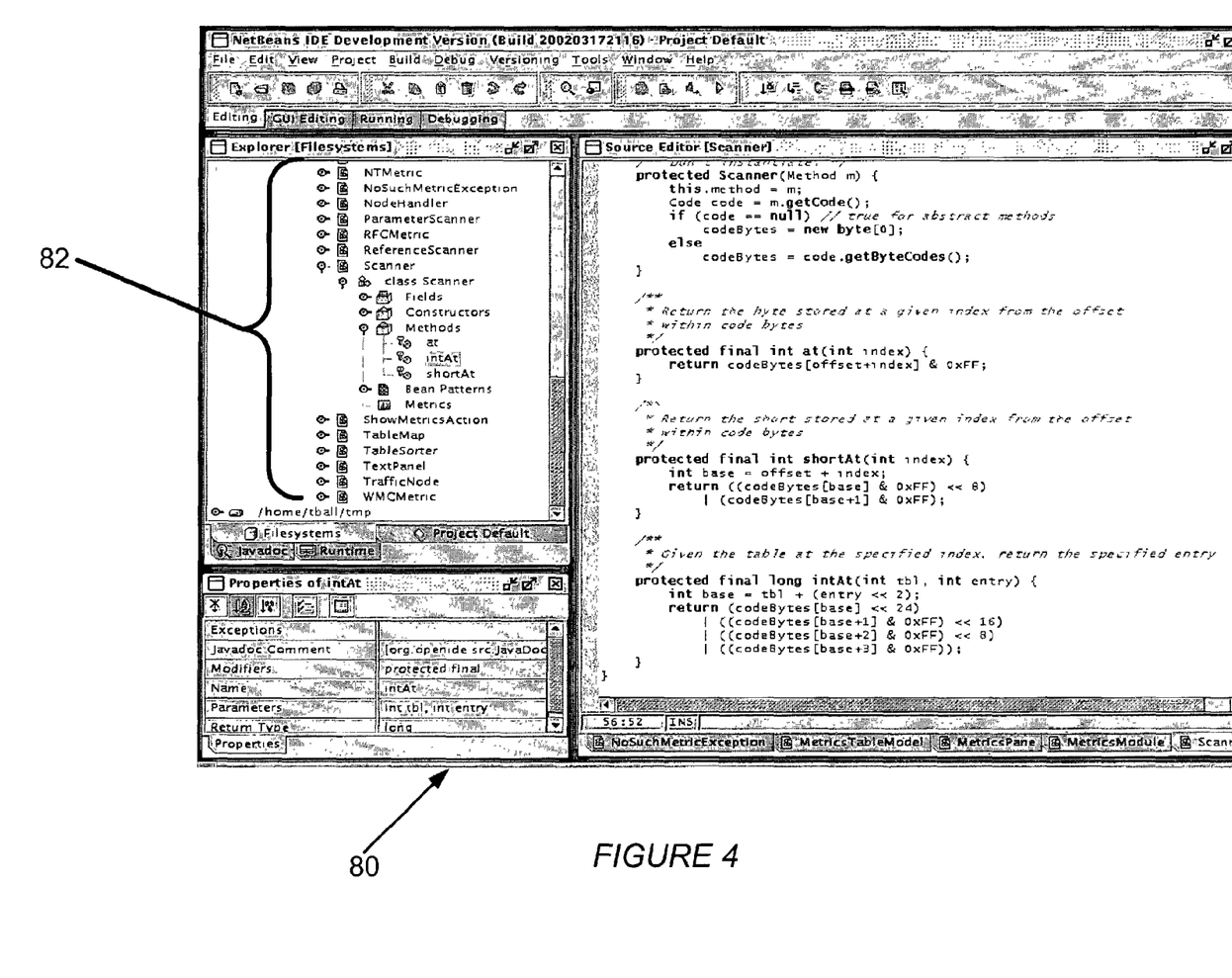
FIG. 4 shows a graphical display used to communicate feedback concerning software metrics information to a user of the development tool in accordance with one or more embodiments of the invention.

FIG. 4 shows a graphical display (80) used, in accordance with one or more embodiments of the invention, to communicate feedback concerning software metrics information to a user of a development tool. The graphical display (80) may be displayed by the development tool. A file directory (82) includes information concerning one or more software components, e.g., classes and methods.

Figure 5:
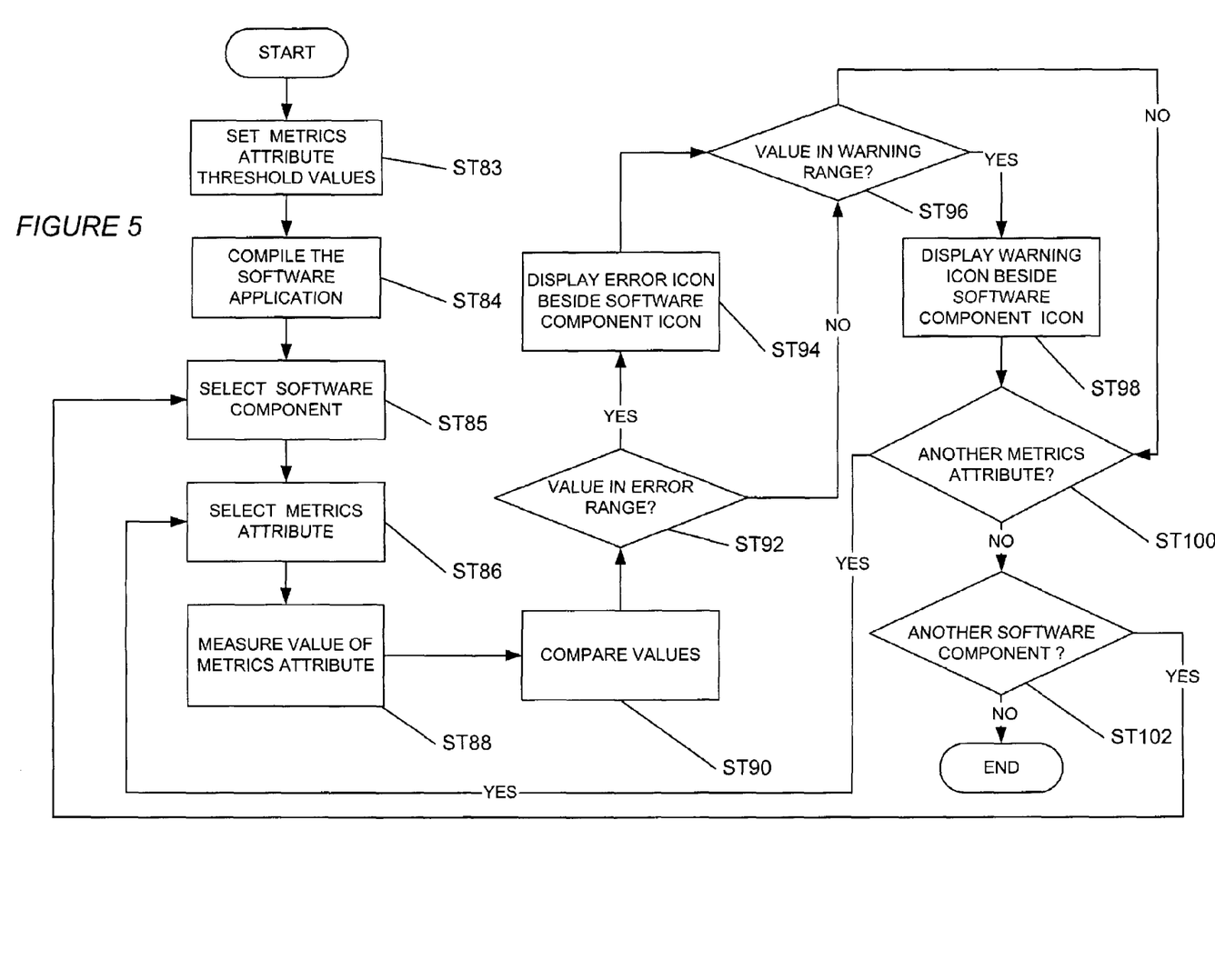
FIG. 5 shows a sequence of operations for communicating feedback concerning software metrics information to a user of a development tool in accordance with one or more embodiments of the invention.
Figure 6:
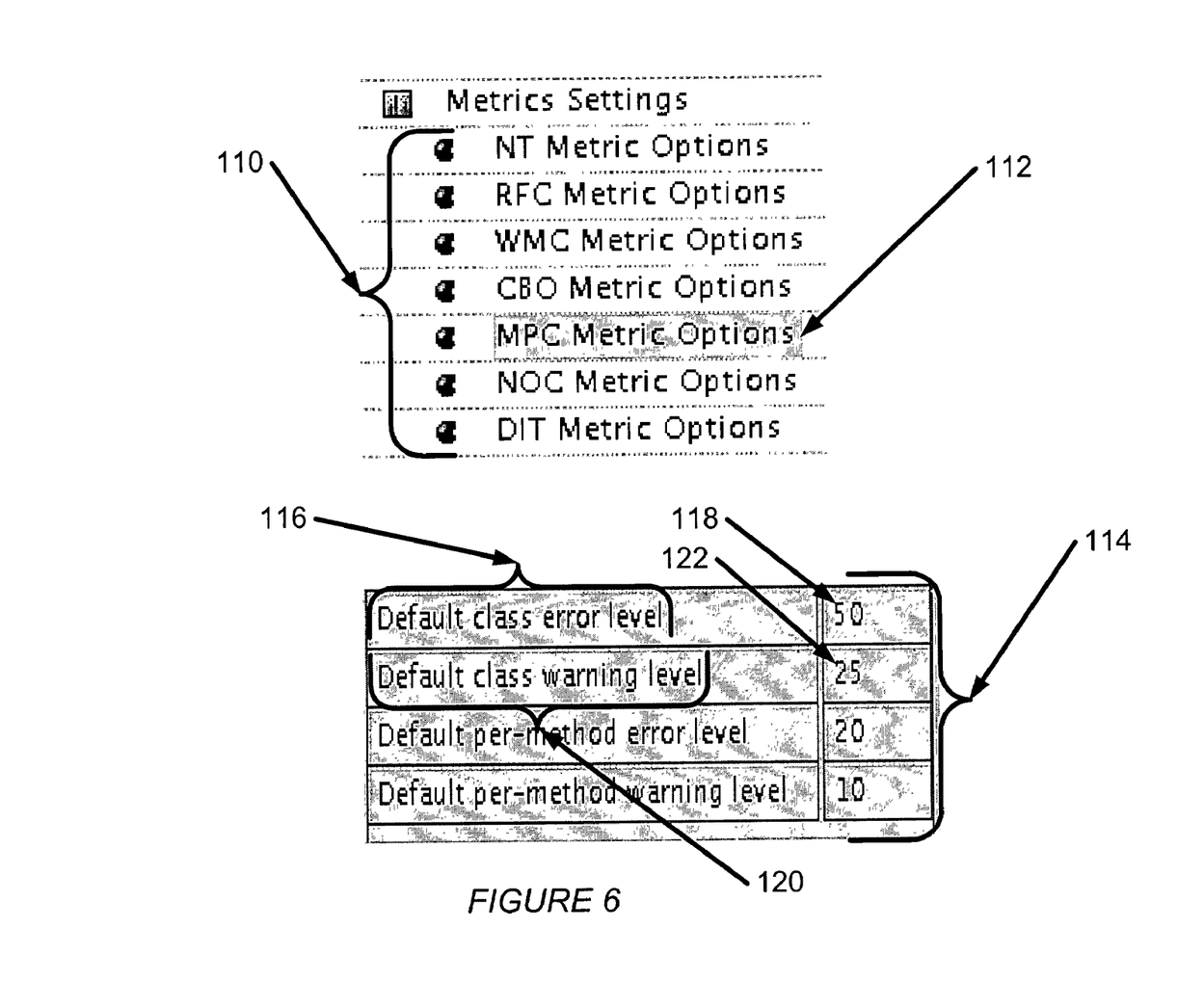
FIG. 6 shows a first and a second graphical display used to set metrics attribute threshold values in accordance with one or more embodiments of the invention.

A sequence of operations for communicating feedback concerning software metrics information to a user of a development tool is shown in FIG. 5. In one or more embodiments of the invention, the sequence of operations begins with setting the metrics attribute threshold values for a particular software application (Step 83). For example, the metrics attribute threshold values may be set as shown in FIG. 6, where a first graphical display (110) with an MPC metric option (112) is selected, which represents an MPC metrics attribute. In order to set a threshold value for the MPC metrics attribute, the user may, for example, right click with a mouse on the MPC metric option (112) to bring up a dialog box or data entry form, or the like, into which the user types one or more metrics attribute threshold values for the MPC metrics attribute.

A metrics attribute threshold values display (114) shows current metrics attribute threshold values for the MPC metrics attribute. In accordance with one or more embodiments of the invention, a warning and an error level threshold value may be set for one or more software components (e.g., for a class or method). For example, a Default Class Error Level (116) has a current threshold value (118) of 50, and a Default Class Warning Level (120) has a current threshold value (122) of 25. Thus, for the MPC metrics attribute, the set of undesirable metrics attribute values includes a range of undesirable values from 25 to positive infinity, of which 25 to 49 is an warning range, and 50 to positive infinity is an error range.

Referring to FIG. 5, once the metrics attribute threshold values have been set, the software application is compiled (Step 84). For example, the software application may be compiled using the development tool. Then, a software component of the software application is selected (Step 85). For example, the software application may include a class named MetricsFactory, which is selected. In accordance with one or more embodiments of the present invention, the performance of Step 85 is triggered by the performance of Step 84.

Once the software component is selected, a metrics attribute is selected (Step 86). For example, an MPC metrics attribute may be selected. The value of the selected metrics attribute (e.g., MPC) is measured (Step 88). For example, the MPC metrics attribute may have a measured value of 100. A comparison is made between the measured value of the selected metrics attribute and the threshold value included in the metrics attribute threshold values for the selected metrics attribute (Step 90). A determination is made as to whether the measured value of the selected metrics attribute falls into an error range (Step 92). For example, if an error level threshold value for the MPC metrics attribute is set at 50, and the MPC metrics attribute has a measured value of 100, then the measured value of the selected metrics attribute does fall into the error range (i.e., between 50 and positive infinity).

Figure 7:
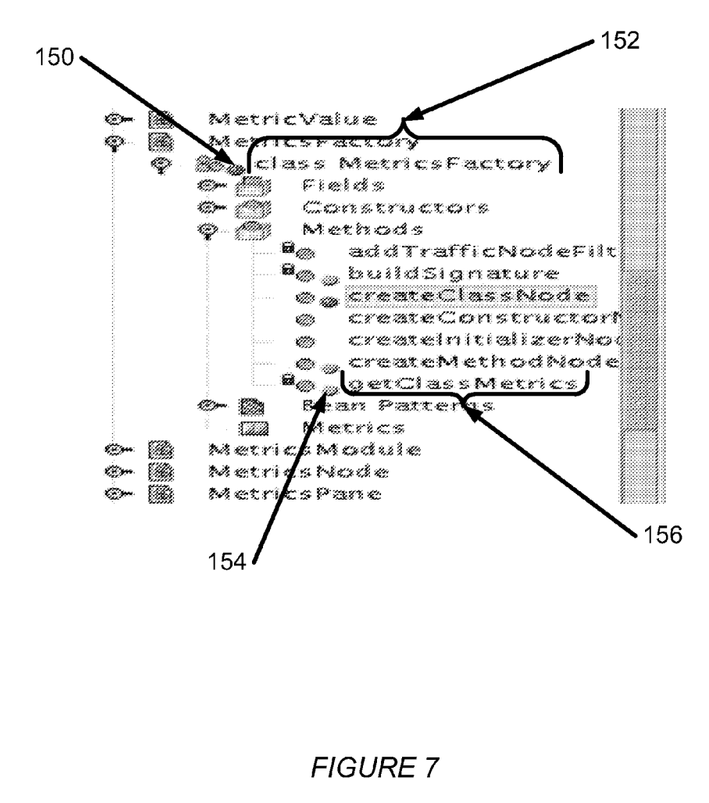
FIG. 7 shows a graphical display with an error icon and a warning icon in accordance with one or more embodiments of the invention.

If the measured value of the selected metrics attribute falls into the error range, a metrics feedback icon, e.g., an error icon is displayed as feedback to the user (Step 94). In accordance with one or more embodiments of the present invention, the error icon is displayed adjacent to an icon or text representing the selected software component. For example, FIG. 7 shows an error icon (150) placed adjacent to a first text icon (152) representing the MetricsFactory class. In accordance with one or more embodiments of the invention, the appearance of the error icon (150) may be altered. For example, the error icon may be colored a particular color (e.g., red), so as to distinguish the error icon (150) from other icons, such as a warning icon.

Referring to FIG. 5, if the measured value of the selected metrics attribute does not fall into an error range as determined in Step 92, then a determination is made as to whether the measured value of the selected metrics attribute falls into a warning range (Step 96). If the measured value of the selected metrics attribute falls into the warning range, a metrics feedback icon, e.g., a warning icon is displayed as feedback to the user (Step 98).

In accordance with one or more embodiments of the present invention, the warning icon is displayed adjacent to an icon or text representing-the selected software component. For example, FIG. 7 shows a warning icon (154) placed adjacent to a second text icon (156) representing a get ClassMetrics method. In accordance with one or more embodiments of the invention, the appearance of the warning icon (150) may be altered. For example, the warning icon may be colored a particular color (e.g., yellow), so as to distinguish the warning icon (150) from other icons, such as the error icon.

Referring to FIG. 5, after displaying either the warning icon or the error icon, or neither, a determination is made as to whether another metrics attribute exists for the selected software component (Step 100). If another metrics attribute exists, another metrics attribute is selected (Step 86), and the sequence continues from that point. For example, an NT metrics attribute may be selected. Otherwise, a determination is made as to whether another software component exists (Step 102). If another software component exists, another software component (e.g., a class, method, etc.) is selected (Step 85), and the sequence continues from that point.

In accordance with one or more embodiments of the invention, metrics feedback icons (e.g., the error icon and the warning icon) shown in FIG. 7 are displayed in a persistent manner while the user develops software using the development tool and/or IDE. For example, the user may compile and develop the software application, and the metrics feedback icons may remain visible to the user while development of the software application continues. Also, instead of displaying a metrics feedback icon to indicate an undesirable value of a metrics attribute, a text icon representing a software component that is associated with the metrics attribute may be altered in terms of style, color, or other aspect of appearance. For example, the font of the text icon may be italicized, or color of the text icon may be changed. Those skilled in the art will appreciate that multiple mechanisms and/or agencies may be used to indicate an alarm-status metrics attribute.

Advantages of embodiments of the invention may include one or more of the following. Provision is made for timely feedback to the user of the development tool regarding values of software metrics as applied to software applications being developed by the user. For example, instead of a separate metrics report sent to the management team at designated points (e.g., mid-release cycle) in the software development cycle, timely, prompt feedback is delivered to each software developer via a modification of the graphical display of an IDE. Furthermore, persistent display of metrics feedback icons using the IDE, which the developer usually sees on a daily basis, may provide improved follow-through on correction of software problems, because the developer is provided with reminders via the feedback icons during development of software. Thus, using the present invention, quality of the software application may be enhanced and cost of production of the software may be lowered. Provision is made to lower cost of software development because correction of software problems indicated by the metrics feedback icons is made early in the development cycle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of providing software metrics attribute feedback, comprising:
   setting a metrics attribute threshold value for a software component;
   generating a plurality of undesirable metrics attribute values using the metrics attribute threshold value;
   compiling the software component using an integrated development environment;
   measuring a metrics attribute value of the software component;
   displaying a metrics feedback icon within the integrated development environment if the metrics attribute value equals at least one of the plurality of undesirable metrics attribute values; and
   modifying the software component by developing software code with the integrated development environment while the metrics feedback icon is visible.

2. The method of claim 1, wherein the metrics attribute threshold value comprises an error value.

3. The method of claim 1, wherein the metrics attribute threshold value comprises a warning value.

4. The method of claim 1, wherein measuring the metrics attribute value is triggered by compiling the software component.

5. A software metrics feedback mechanism, comprising:
   a software component compiled via an integrated development environment;
   a data store comprising a metrics attribute threshold value and a plurality of undesirable metrics attribute values of the software component; and
   a metrics feedback icon displayed within the integrated development environment if a metrics attribute value of the software component equals at least one of the plurality of undesirable metrics attribute values,
   wherein the software component is modified by developing software code with the integrated development environment while the metrics feedback icon is visible.

6. The software metrics feedback mechanism of claim 5, wherein the metrics attribute threshold value comprises an error value.

7. The software metrics feedback mechanism of claim 5, wherein the metrics attribute threshold value comprises a warning value.

8. The software metrics feedback mechanism of claim 5, wherein the metrics attribute threshold value is configurable.

9. The software metrics feedback mechanism of claim 5, wherein the plurality of undesirable metrics attribute values of the software component is generated using the metrics attribute threshold value.

10. The software metrics feedback mechanism of claim 5, wherein measuring the metrics attribute value is triggered by compiling the software component.

11. A computer system for providing software metrics attribute feedback, comprising:
   a processor;
   a memory;
   a storage device;
   a computer display; and
   software instructions stored in the memory for enabling the computer system under control of the processor, to perform:

setting a metrics attribute threshold value for a software component;

generating a plurality of undesirable metrics attribute values using the metrics attribute threshold value;

compiling the software component using a an integrated development environment;

measuring a metrics attribute value of the software component;

displaying on the computer display a metrics feedback icon within the integrated development environment if the metrics attribute value equals at least one of the plurality of undesirable metrics attribute value and modifying the software component by developing software code with the integrated development environment while the metrics feedback icon is visible.

12. The computer system of claim 11, wherein the metrics attribute threshold value comprises an error value.

13. The computer system of claim 11, wherein the metrics attribute threshold value comprises a warning value.

14. The computer system of claim 11, wherein measuring the metrics attribute value is triggered by compiling the software component.

15. An apparatus for providing software metrics attribute feedback, comprising:

means for setting a metrics attribute threshold value for a software component;

means for generating a plurality of undesirable metrics attribute values using the metrics attribute threshold value;

means for compiling the software component using an integrated development environment;

means for measuring a metrics attribute value for the software component;

means for displaying a metrics feedback icon within the integrated development environment if the metrics attribute value equals at least one of the plurality of undesirable metrics attribute values and means for modifying the software component by developing software code with the integrated development environment while the metrics feedback icon is visible.

* * * * *